United States Patent [19]

Häfner

[11] Patent Number: 4,466,297
[45] Date of Patent: Aug. 21, 1984

[54] DEVICE FOR MEASURING A FORCE

[75] Inventor: Hans W. Häfner, Aichach, Fed. Rep. of Germany

[73] Assignee: Pfister GmbH, Fed. Rep. of Germany

[21] Appl. No.: 478,169

[22] Filed: Mar. 23, 1983

[30] Foreign Application Priority Data

Apr. 1, 1982 [DE] Fed. Rep. of Germany ....... 3212099

[51] Int. Cl.$^3$ .............................................. G01L 1/04
[52] U.S. Cl. .............................. 73/862.64; 73/862.38; 177/DIG. 9; 308/3 R
[58] Field of Search .......... 73/862.38, 862.58, 862.62, 73/862.64; 74/110; 308/3 R; 177/DIG. 9

[56] References Cited

U.S. PATENT DOCUMENTS

| | | | |
|---|---|---|---|
| 3,544,415 | 12/1970 | Price et al. | 308/3 R |
| 3,745,819 | 7/1973 | Earl | 73/862.58 X |
| 3,794,390 | 2/1974 | Kilcher | 308/3 R |
| 3,993,149 | 11/1976 | Harvey | 177/163 |
| 4,213,509 | 7/1980 | Hafner | 177/DIG. 9 |

FOREIGN PATENT DOCUMENTS 2331149  8/1981  Fed. Rep. of Germany .

Primary Examiner—Charles A. Ruehl
Attorney, Agent, or Firm—Hill, Van Santen, Steadman & Simpson

[57] ABSTRACT

A device for measuring a force, such as a weighing device, has a force resolving plane inclined relative to the horizontal and a force measuring means for measuring the component of the force effective in the resolving plane. The measuring system includes at least two elements having surfaces in the resolving plane or parallel thereto, one of which is a support element rigidly secured to a frame on which the device is mounted, and the other of which is displacably disposed relative thereto in the resolving plane and is connected through the force measuring means to the frame. At least one elastic intermediate layer is disposed between the faces of the elements inclined relative to each other such that the force measuring means operates substantially independently of the path of the load or force to be measured.

18 Claims, 7 Drawing Figures

DEVICE FOR MEASURING A FORCE

BACKGROUND OF THE INVENTION

The invention disclosed and claimed herein relates to a device for measuring a force, such as a weighing device, and in particular to such a device having a force resolving plane inclined relative to the horizontal and a force measuring means as part of a measuring system for measuring components of the force effective in the plane of resolution.

A platform scale connected to a load measuring cell is described in German LP 2,331,149 which resolves the force or load components into vertical and horizontal components, the magnitude of the load being determined from the horizontal component. The platform scale has a load bridge supported by means of linking blocks on a guidance means in the form of an oblique plane which is inclined at an angle with respect to the direction of the force measurement. The linking blocks have a channel for a hydraulic agent, the hydraulic agent channel being connected via conduits to a device for supplying a fluid agent, such as low-viscosity oil. In general, this conventional device can be described as a device equipped with hydrostatic linking blocks for resolving a force for the purpose of measuring components of the force acting in the plane of the force resolution.

Producing the hydrostatic hydraulic agent film for effecting a friction-free movement of the linking blocks relative to one another necessitates the use of a hydraulic system, with all conventional functional elements of a hydraulic circulation means such as a reservoir, filters, pumps, switching element, and the like. Moreover, a dust-tight enclosure for the linking blocks is required because the hydraulic circulation must be maintained free of dirt particles. The component outlay required for this purpose is considerable, and moreover requires operating energy and an energy supply means.

The use of a hydrostatic support means for a weighing device, however, has the significant advantage of a rugged structure with substantially arbitrary transmission of the force resolution without the use of steel beams, levers, pendulum suspensions, knife edges, or similar mechanical devices which are conventional in weighing technology. Further advantages are achieved by the relatively small structure of the hydrostatic support for the heavy duty weighing means which, in contrast to other types of weighing means, does not require a deep scale pit. Hydrostatic systems further achieve optimum damping properties for the overall scale system.

SUMMARY OF THE INVENTION

It is an object of the present invention to provide a scale means which retains all of the advantages of conventional hydrostatic force resolving devices without the significant component outlay required by such devices, and particularly a device which eliminates the component outlay for a hydraulic system as well as its associated energy requirements.

The above object is inventively achieved in a device for measuring a force having a force resolving plane inclined relative to the horizontal, and a force measuring means including a measuring system for measuring components of the force effective in the plane of resolution and having at least two functional elements exhibiting surfaces in the plane of resolution or parallel thereto, one of which is rigidly anchored to a frame supporting the device and the other of which displacably disposed relative thereto in the plane of resolution and which is connected to the frame through the force measuring means, and wherein at least one elastically effective intermediate layer is disposed between the surfaces of the functional elements. The measuring system for the force measuring means functions substantially independently of its displacement path under load conditions.

The device disclosed and claimed herein retains all of the advantages of conventional hydrostatic force resolving devices but eliminates the hydraulic system necessary in such known devices. By utilizing an elastic intermediate layer or pillow and a measuring system functioning path independently, the device disclosed and claimed herein achieves an exact and substantially friction-free (and therefore error-free) force resolution, which is a pre-requisite for an accurate force measurement. Only one component of the force to be measured, which is small in comparison to the total force, is utilized for measurement purposes. This small component can be maintained as small as desired based on the magnitude of the angle of the resolving plane relative to the direction of the force. This permits a correspondingly small and thus sensitive measuring and display device to be achieved.

A further advantage of the device disclosed and claimed herein is that the device exhibits an extremely low total height because no beams, levers, pendulum suspensions, knife edges, and similar mechanical scale elements are required. The advantage of optimum damping of possible oscillations upon initiation of the force is also retained, because the elastic intermediate layer exhibits favorable damping properties. The device disclosed and claimed herein, moreover, requires no operating energy, and is thus able to be used independently of energy supplies.

The above advantages derive from the fact that the elastic intermediate layer is substantially incompressible vertical to the force resolving plane, but exhibits an elasticity in the direction of that plane, given minimum play of, for example, less than 0.2 mm, which approximately corresponds to the flow characteristics of a fluid film.

In a further embodiment of the invention a force initiation element as well as a support element for the device each have wedge-shaped surfaces as does a force resolving element disposed therebetween.

The elastic intermediate layer may extend over the entire surface of the functional elements in the form of a flat pillow or cushion.

A suitable material for the elastic intermediate layer is an elastic solid such as elastomer, rubber or synthetic material, such as silicon caoutchouc having hardness between 20° and 45° SHORE, preferably with approximately 20° SHORE.

Further improvement of the elasticity in the direction of displacement of the force resolving element in the force resolving plane is achieved in an embodiment wherein the intermediate layer is formed by at least one elastic hollow member having a fluid filling, or a solid having gel-like characteristics.

Such a fluid-filled or so-called "super-flexible" solid serves as an intermediate layer which is substantially incompressible in the direction perpendicular to the force resolving plane but which permits substantially friction-free motion in the direction of the force resolving plane given very small paths such as, for example, less than 0.2 mm. Such an intermediate layer thus has properties which are substantially identical to those of a hydrostatic fluid film.

Another embodiment of the invention utilizes an elastic intermediate layer comprised of alternating layers or stratafication of elastomer layers and solid lamellae, such as metal lamellae. In this embodiment, the elastically effective material components of the intermediate layer are prevented from shifting as a result of elastic deformation due to forces acting perpendicularly relative to the resolving plane. The lamellae prevent such a change in shape and thus promote the advantageous property of the elastic intermediate layer that said layer can accept extremely high loads in a direction perpendicular to the force resolving plane, whereas displacement motions can occur practically friction-free in the direction of the force resolving plane, given small motion play.

Another embodiment of the invention utilizes a plurality of spring elements instead of a one-piece intermediate layer or an intermediate layer provided with a filling means.

A plurality of devices of the type described above may be combined in a load chain and connected to a supporting frame via a force measuring means.

DESCRIPTION OF THE PREFERRED EMBODIMENTS

Figure 1:
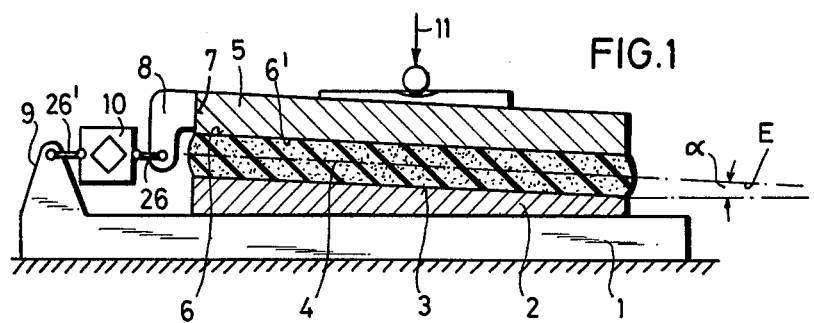
FIG. 1 is a side view, partly in section, of a device for measuring a force constructed in accordance with the principles of the present invention having an elastic intermediate layer in the form of a flat pillow.

A force measuring device constructed in accordance with the principles of the present invention is shown in FIG. 1 supported on a base or frame 1. A wedge-shaped support element 2 is secured thereto having an upper face 3 inclined relative to a horizontal plane forming an angle therewith. An elastic intermediate layer 4 in the form of a flat highly elastic rubber pillow is situated on the upper face 3. The intermediate layer 4 has an upper side 6 on which a force initiation element 5 is disposed. A force resolving plane E extends between the upper face 3 of the support element 2 and the lower face 6' of the force initiation element 5. A force to be measured is referenced at 11.

The force resolving plane E proceeds approximately through the center of the intermediate layer 4. A projection 8 extends from an end face 7 of the force initiation element 5, and a projection 9 extends from the frame 1. A force measuring means 10 is suspended between the two projections 8 and 9 by a suspension means 26 and 26' (shown schematically).

Figure 2:
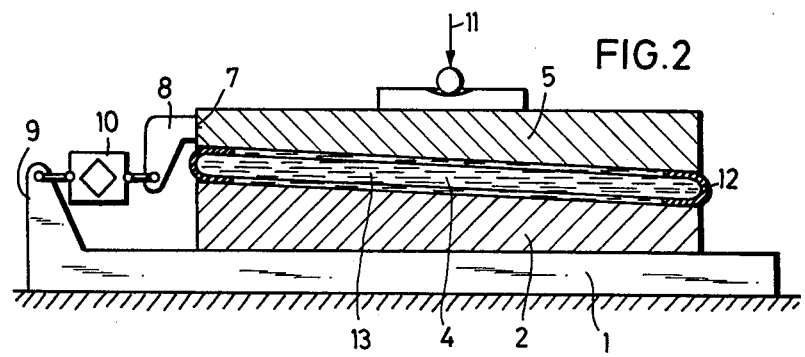
FIG. 2 is a side view, partly in section, of a second embodiment of the invention having an intermediate layer formed by an elastic hollow member having a fluid fill.

A further embodiment of the invention is shown in FIG. 2, also including a frame 1, a wedge-shaped support element 2, an intermediate layer 4, and a force initiation element 5. In this embodiment, the intermediate layer 4 is in the form of an elastic hollow member such as a gasket 12. The gasket 12 surrounds a fill 13 consisting of a fluid. The fluid may be, for example, a low-viscosity silicon fluid. The remaining components of the device already identified in connection with FIG. 1 have the same reference numerals and perform the same function in the embodiment of FIG. 2.

Figure 3:
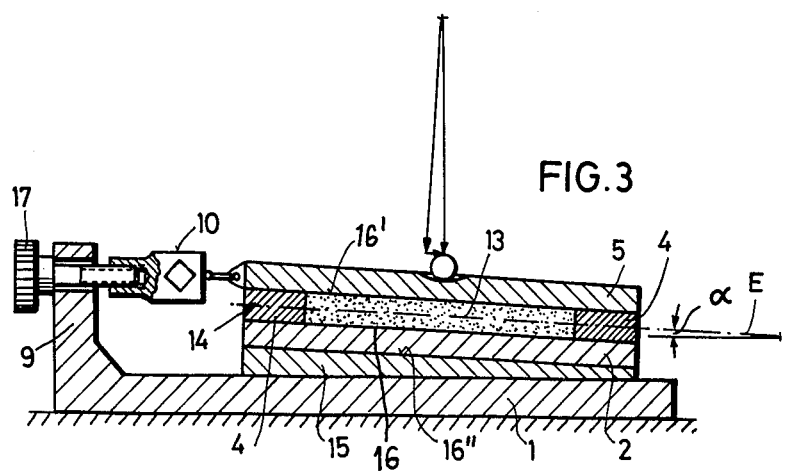
FIG. 3 is a side view, partly in section, of a third embodiment of the invention having an intermediate layer formed by an elastic hollow member with a gel-like solid filling.

Another embodiment of the device is shown in FIG. 3 wherein the support element 2 and the force initiating (or load accepting) element 5 are parallel plates. The elastic intermediate layer 4 is in the form of a closed circumnavigant edge element 14 disposed between a face 16 of the lower plate 2 and a face 16' of the upper plate 5, this forming an elastic hollow member having a fill 13. In the illustrated example, the fill 13 consists of a solid having a gel-like nature, for example, a silicone caoutchouc polymer having a hardness of 20° through 25° SHORE. Given substantially small motion play, this solid exhibits properties which are substantially identical to those of a hydrostatic fluid film. The angle α of the force resolving plane E is formed by a wedge-shaped metallic layer 15 disposed between the frame 1 and the lower face 16'' of the support element 2. The rigid projection 9 of the frame 1 has an adjustment means in the form of a knurled screw 17 which is threaded into the force measuring means 10, and thus enables precise adjustment of the zero point of the force measuring means 10.

Figure 4:
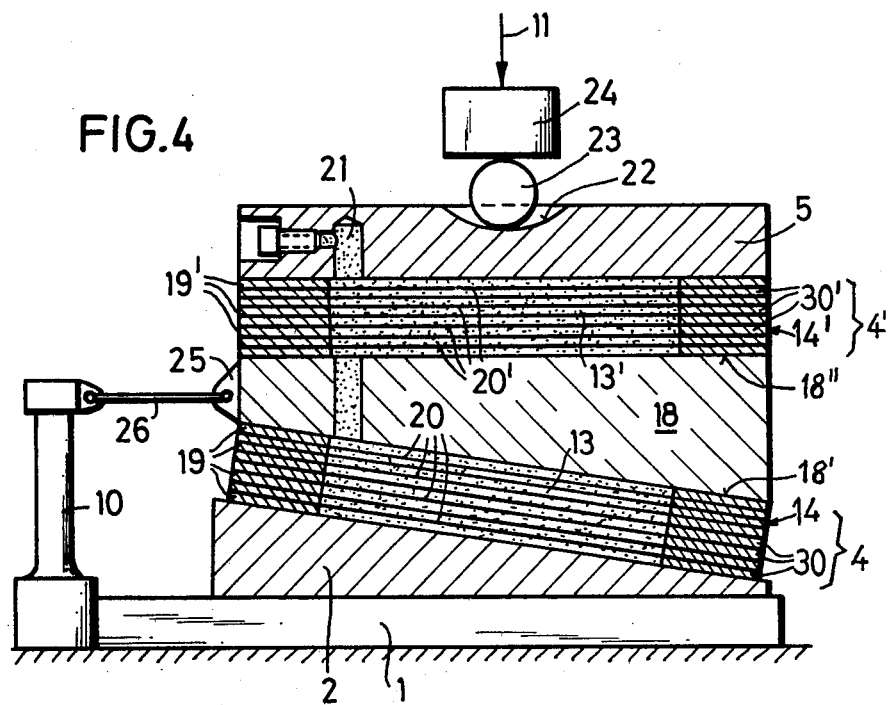
FIG. 4 is a side view, partly in section, of a fourth embodiment of the invention having two intermediate layers and wedge-shaped components.

A further embodiment of the invention is shown in FIG. 4 having a force resolving wedge 18 with inclined surfaces 18' and 18''. The wedge 18 is disposed between two intermediate layers 4 and 4'. The intermediate layers 4 and 4' are respectively comprised of closed edge sections 14 and 14' forming elastic hollow members respectively containing fills 13 and 13'. The edge sections 14 and 14' consist of stratafications of elastomer layers 30 and 30' with embedded metal lamellae 19 and 19' therebetween. The force initiation element 5 has a closable channel 21 for introducing the filling 13 and 13'. A parallel aeration channel may, if necessary, be additionally provided (but is not shown in the drawing).

A depression 22 is provided in the force initiation element 5 for absorbing the force 11, the depression 22 receiving a pressure ball 23 on which a force applying member 24 acts. The intermediate wedge 18 has a flange 25 for connecting the wedge 18 to a force measuring means 10 via a connecting linkage 26. The force measuring means 10 may be a wire resistance strain gauge functioning substantially independently of the path of the force to be measured and being loaded for flexing. The path of the wedge 18 from zero load to maximum load amounts at most to $10^{-2}$ mm.

Figure 5:
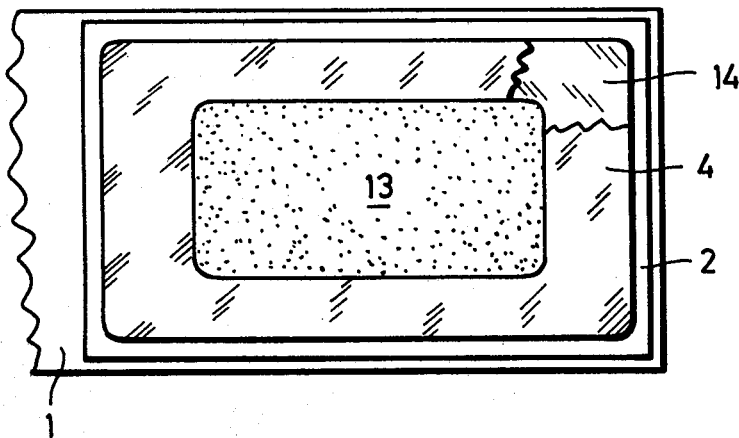
FIG. 5 is a plane view of the support element shown in FIG. 4 having an elastic intermediate layer with a gel-like solid filling.

A face of the support element 2 is shown in plan view FIG. 5 wherein a face of the wedge 18 with the edge section 14 forming the elastic intermediate layer 4 can also be seen. The shape of the edge section 14 defining the closed space for the fill 13 can be seen in FIG. 5 as well.

Figure 6:
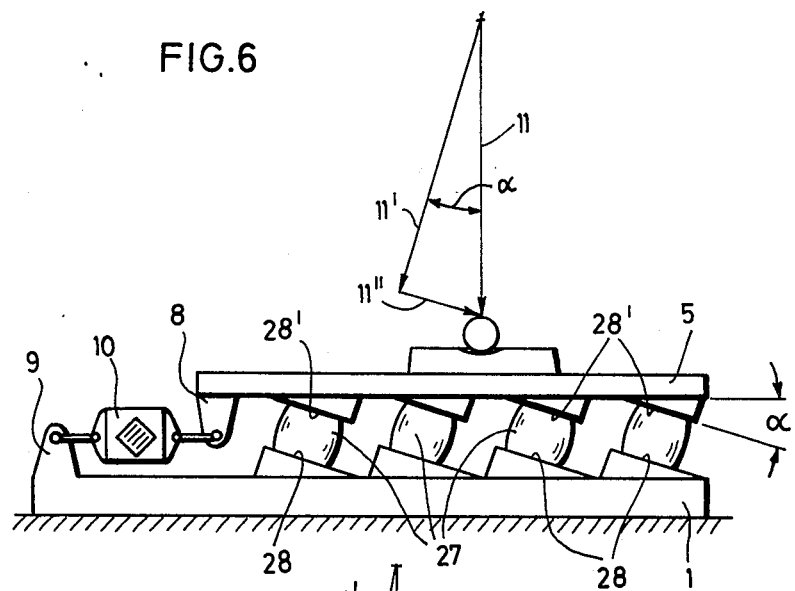
FIG. 6 is a side view of a fifth embodiment of the invention having an intermediate layer in the form of a plurality of springs.

A further embodiment of the invention is shown in FIG. 6 wherein the intermediate layer is formed by a plurality of individual springs 27. The springs 27 are disposed between obliquely disposed surfaces 28 and 28'. The angle of inclination α of the surfaces 28 and 28' simultaneously defines the direction of the force resolving plane (not illustrated). Accordingly, a force resolving triangle can be derived having an acute angle with a force vector 11 with a component 11' perpendicular to the force resolving plane and a component 11" in the direction of the force resolving plane. The component 11" is measured by a force measuring means 10 suspended between the force initiation element 5 and the frame 1.

It is important to operation of the device disclosed and claimed herein that the force measuring means 10 function substantially independently of the displacement path which occurs under load conditions. As used herein, the term "path independent" means a path or displacement length of less than 0.2 mm. Many types of force measuring means having this required characteristic are known in the art such as, for example, strain or pressure gauges, gyroscopic measuring cells, and piezoelectrical force indicators.

Figure 7:
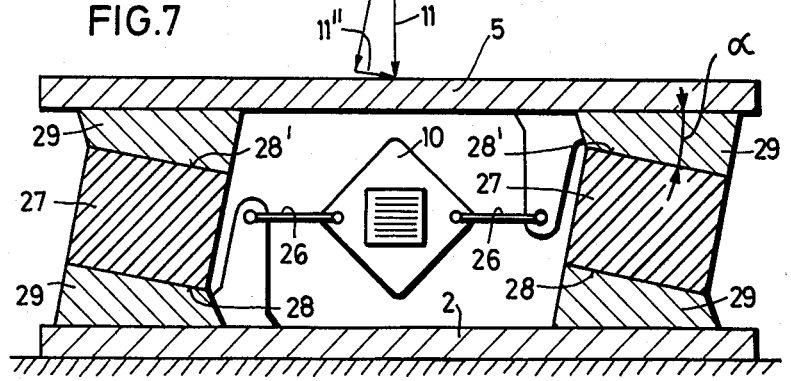
FIG. 7 is a side view, partly in section, of a personal scale constructed in accordance with the principles of the present invention.

A personal scale embodying the principles of the present invention is shown in FIG. 7. The scale consists of a support element 2 and a force initiation element 5. Both elements are mirror-symmetric plates each preferably manufactured of synthetic material in one piece. The support element 2 and the force initiation element 5 each have slanting cap pieces 29 with respective inclined surfaces 28 and 28'. High volume intermediate layers in the form of spring elements 27 are disposed therebetween occupying the width of the scale platform formed by the force initiation element 5 as seen in cross-section. Under the influence of a force 11, for example, the load of a human body, the force initiation element 5 attempts to yield to the right as a result of the force component 11". Because the force initiation element 5 and the support element 2 are rigidly secured to one another through the force measuring means 10 and by the suspension linkage 26, the component 11" is detected independently of the path and measured by the force measuring means 10. This structure achieves a particularly low cost rugged personal scale because all conventional force transmission means such as levers, pendulum suspensions, blocks, knife edges, and other movable parts. The principle components of the personal scale, that is, the two mirror-symmetric one piece synthetic plates with the cap pieces thereon, can be easily manufactured. The scale renders a very precise weight result due to substantially exact force resolving which is based on the exploitation of the special properties of the elastic intermediate layer, specifically, that given very small measuring paths in the direction of the force resolving plane, this intermediate layer behaves as a hydrostatic lubricant film but without the necessity of an associated hydraulic system and energy source.

Although modifications and changes may be suggested by those skilled in the art it is the intention of the inventor to embody within the patent warranted hereon all changes and modifications as reasonably and properly come within the scope of his contribution to the art.

I claim as my invention:

1. A device for measuring a force exhibiting a force resolving plane inclined relative to the direction of said force, said device comprising:
   a frame;
   a support element rigidly anchored to said frame and having a surface in said force resolving plane or parallel thereto;
   a force resolving element having a surface in said resolving plane and being displacably mounted relative to said support element;
   a force measuring means for measuring a component of said force effective in said force resolving plane, said force measuring means being interconnected between said force resolving element and said frame, said force measuring means measuring said force component substantially independently of the path of said force; and
   an elastic intermediate layer disposed between said surfaces of said support element and said force resolving element.

2. A device as claimed in claim 1 further comprising a force initiation element, said force resolving element being disposed between said force initiation element and said support element, and said force resolving element having wedge-shaped faces.

3. A device as claimed in claim 1 wherein said intermediate layer extends over the entire surface of said support element and said force resolving element and consists of a flat pillow.

4. A device as claimed in claim 1 wherein said intermediate layer consists of an elastic solid selected from the group consisting of elastomer, rubber, synthetic and silicone caoutchouc having a hardness between 20° and 45° SHORE.

5. A device as claimed in claim 1 wherein said intermediate layer consists of an elastic hollow member having a hollow interior and a fill material occupying said hollow interior.

6. A device as claimed in claim 5 wherein said fill material is a fluid.

7. A device as claimed in claim 5 wherein said fill material is a gel-like solid.

8. A device as claimed in claim 1 wherein said intermediate layer consists of alternating stratifications of elastomer layers and solid lamellae.

9. A device as claimed in claim 8 wherein said solid lamellae are metal lamellae.

10. A device as claimed in claim 8 wherein said intermediate layer is substantially incompressible in a direction perpendicular to said force resolving plane.

11. A device as claimed in claim 1 wherein said intermediate layer is comprised of a plurality of spring elements.

12. A device as claimed in claim 1 wherein said intermediate layer exhibits a minimum elasticity in a direction perpendicular to said force resolving plane and exhibits a maximum elasticity in the direction of said force resolving plane.

13. A device for measuring a force comprising:
   a generally horizontal base element;
   at least two functional elements disposed above said base element, a first of said functional elements being rigidly connected to said base element and a second of said functional elements being displacably mounted relative to said first functional element, said device exhibiting a force resolving plane inclined relative to the direction of said force and said first and second functional elements each having respective surfaces in or parallel to said resolving plane;

a force measuring means interconnected between said second functional element and said base element for measuring displacement of said second functional element substantially independently of the path of said displacement; and an elastically effective intermediate layer disposed between said surfaces of said functional elements.

14. A device as claimed in claim 13 further comprising a third functional element and a further intermediate layer disposed between said third functional element and said second functional element.

15. A device for measuring a force as claimed in claim 14 wherein said intermediate layer and said further intermediate layer consists of an elastic element extending around the periphery of said surfaces of said functional element so as to form a hollow space in a center of said elastic element, and a filler disposed in said hollow space.

16. A device as claimed in claim 15 wherein said filler is a fluid.

17. A device as claimed in claim 16 wherein said second and third functional elements each have respective channels therein communicating with said hollow opening for filling said hollow opening with said fluid.

18. A device as claimed in claim 15 wherein said filler is a gel-like solid.

* * * * *